(12) United States Patent
Caleffi

(10) Patent No.: US 11,448,328 B2
(45) Date of Patent: Sep. 20, 2022

(54) MIXER VALVE DEVICE

(71) Applicant: CALEFFI S.p.A., Fontaneto d'Agogna (IT)

(72) Inventor: Marco Caleffi, Fontaneto d'Agogna (IT)

(73) Assignee: Caleffi S.p.A.

( * ) Notice: Subject to any disclaimer, the term of this patent is extended or adjusted under 35 U.S.C. 154(b) by 595 days.

(21) Appl. No.: 16/343,601

(22) PCT Filed: Oct. 23, 2017

(86) PCT No.: PCT/EP2017/077015
§ 371 (c)(1),
(2) Date: Apr. 19, 2019

(87) PCT Pub. No.: WO2018/077807
PCT Pub. Date: May 3, 2018

(65) Prior Publication Data
US 2020/0049262 A1    Feb. 13, 2020

(30) Foreign Application Priority Data

Oct. 26, 2016 (IT) .......................... 102016000108293

(51) Int. Cl.
*F16K 11/044* (2006.01)
*G05D 23/13* (2006.01)

(52) U.S. Cl.
CPC ........ *F16K 11/044* (2013.01); *G05D 23/1393* (2013.01)

(58) Field of Classification Search
CPC . G05D 23/1393; G05D 23/134; F16K 11/044
See application file for complete search history.

(56) References Cited

U.S. PATENT DOCUMENTS

| 6,079,625 A | 6/2000 | Lebkuchner |
| 2001/0020645 A1 | 9/2001 | Mountford et al. |
| 2015/0168960 A1* | 6/2015 | Huck ................. G05D 23/1925 236/12.12 |
| 2016/0334807 A1* | 11/2016 | Song .................... G05B 13/048 |

FOREIGN PATENT DOCUMENTS

| DE | 102008058515 A1 | 5/2010 |
| EP | 1724504 A1 | 11/2006 |
| EP | 2400227 A1 | 12/2011 |

* cited by examiner

*Primary Examiner* — Schyler S Sanks
(74) *Attorney, Agent, or Firm* — Laubscher & Laubscher, P.C.

(57) ABSTRACT

A mixer valve device, in particular for mixing hot and cold water, has a movable shutter that adjusts the flow of hot water and of cold water into a mixing chamber so as to have in the outlet mixed hot/cold water at a given preset temperature; the device combines a gearmotor and a thermostat; during the step of setting the device the gearmotor moves the shutter to the position substantially corresponding to the required temperature of the mixed water; the thermostat maintains the required temperature within a preset tolerance by moving the shutter correspondingly. A mixer valve device is thus made that has reduced mechanical wear and low electric consumption and is safe and reliable.

9 Claims, 8 Drawing Sheets

MIXER VALVE DEVICE

CROSS-REFERENCE TO EARLIER APPLICATIONS

This application is a § 371 National Stage Entry of PCT/EP2017/077015 filed Oct. 23, 2017. PCT/EP2017.077015 claims priority of IT102016000108293 filed Oct. 26, 2016. The entire content of these application are incorporated herein by reference.

BACKGROUND OF THE INVENTION

The present invention relates to a mixer valve device, intended for mixing hot and cold fluid, in particular hot and cold water.

Electronic thermoregulating mixer valves are known for installations for dispensing domestic hot water.

These valves provide a valve body and a gearmotor that controls the position of a ball shutter arranged inside the valve body, in function of the instantaneous temperature of the mixed water and of the desired temperature. The temperature of the mixed water is detected by a 2 thermal probe arranged along the outlet path of the mixed water.

Owing to this type of mixer valve it is also possible to thermally disinfect the installation automatically to reduce the risk of proliferation of the legionella bacterium in the installation.

In order to perform this automatic disinfection, at the time and on the day set by the user, the gearmotor moves the ball shutter so as to open completely the hot path and close completely the cold path for a time that is a function of the temperature detected by the thermal probe. The circulation of water at high temperature in the installation causes the installation to be disinfected.

One problem of these mixer valves is that, as they are controlled by a gearmotor that is always moving, they are subject to wear.

Another problem of these mixer valves is that in the event of an interruption to the electric power supply to the gearmotor or of a gearmotor motor fault these mixer valves are unable to perform the thermoregulating task.

The main object of the present invention is to propose a mixer valve device that is able to solve the aforesaid problems.

Another object of the present invention is for this mixer valve device to have low electric consumption.

A further object of the present invention is for this mixer valve device to be reliable over time.

BRIEF DESCRIPTION OF THE DRAWINGS

In order to better understand the invention, a description is given below of a non-limiting exemplary embodiment thereof, illustrated in the attached drawings, in which.

DETAILED DESCRIPTION OF THE INVENTION

The illustrated mixer device, indicated generally with 10, is intended in particular to mix hot water and cold water.

The device 10 has a gearmotor 11 and a valve 12 that are structurally and functionally interconnected.

Figure 1:
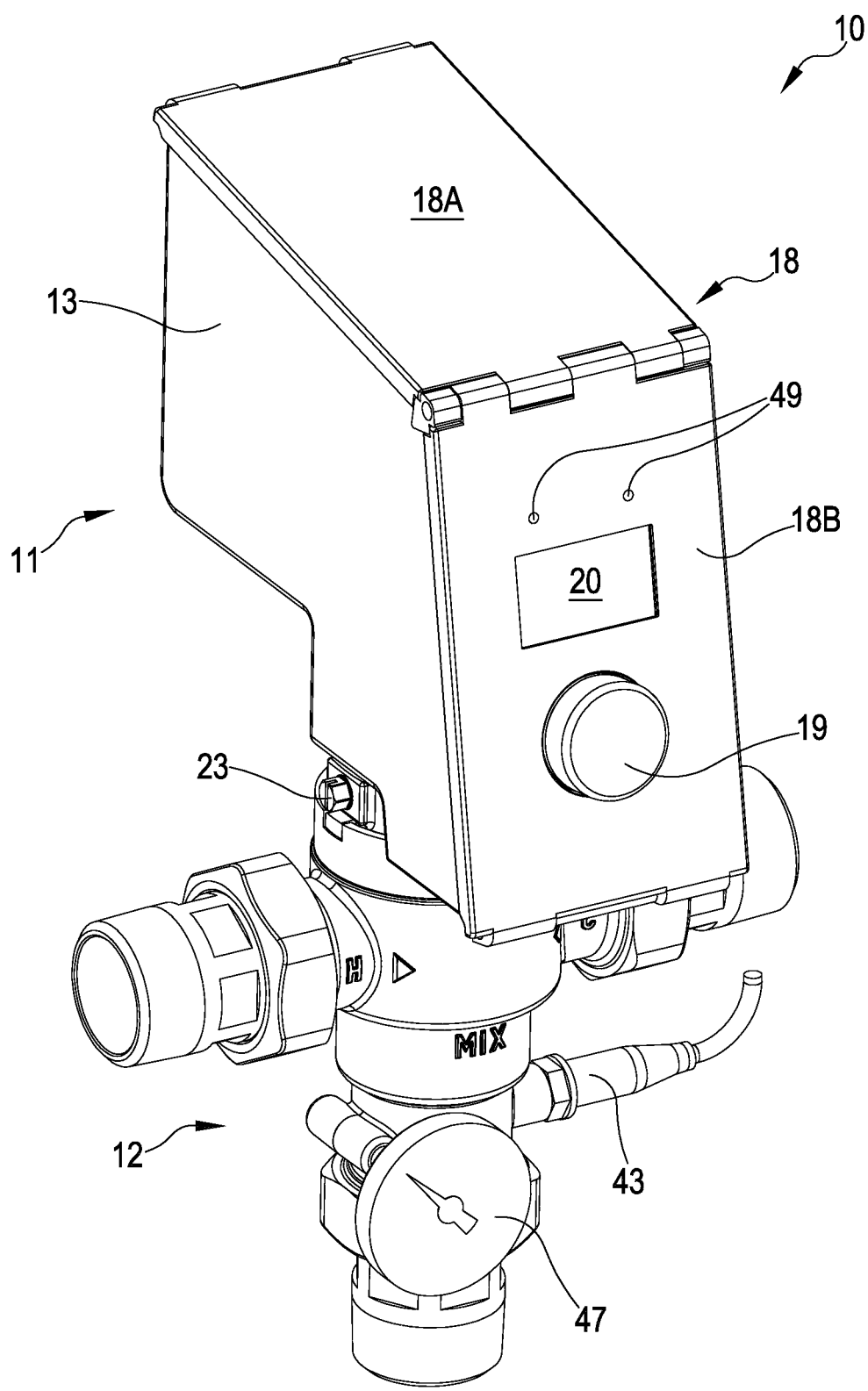
FIG. 1 is a perspective view of a mixer valve device according to the invention.
Figure 2:
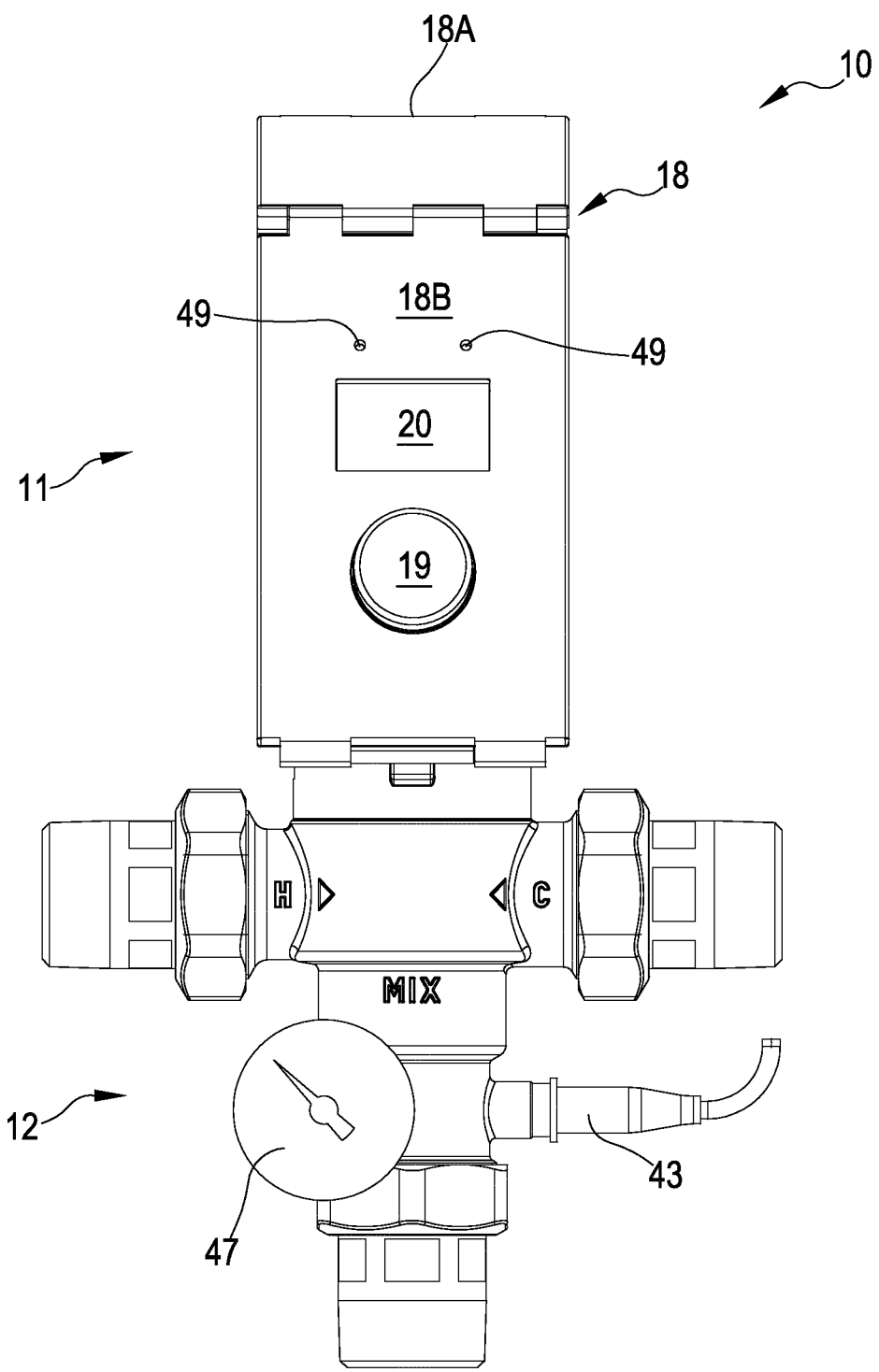
FIG. 2 is a frontal view of the device of FIG. 1.
Figure 3:
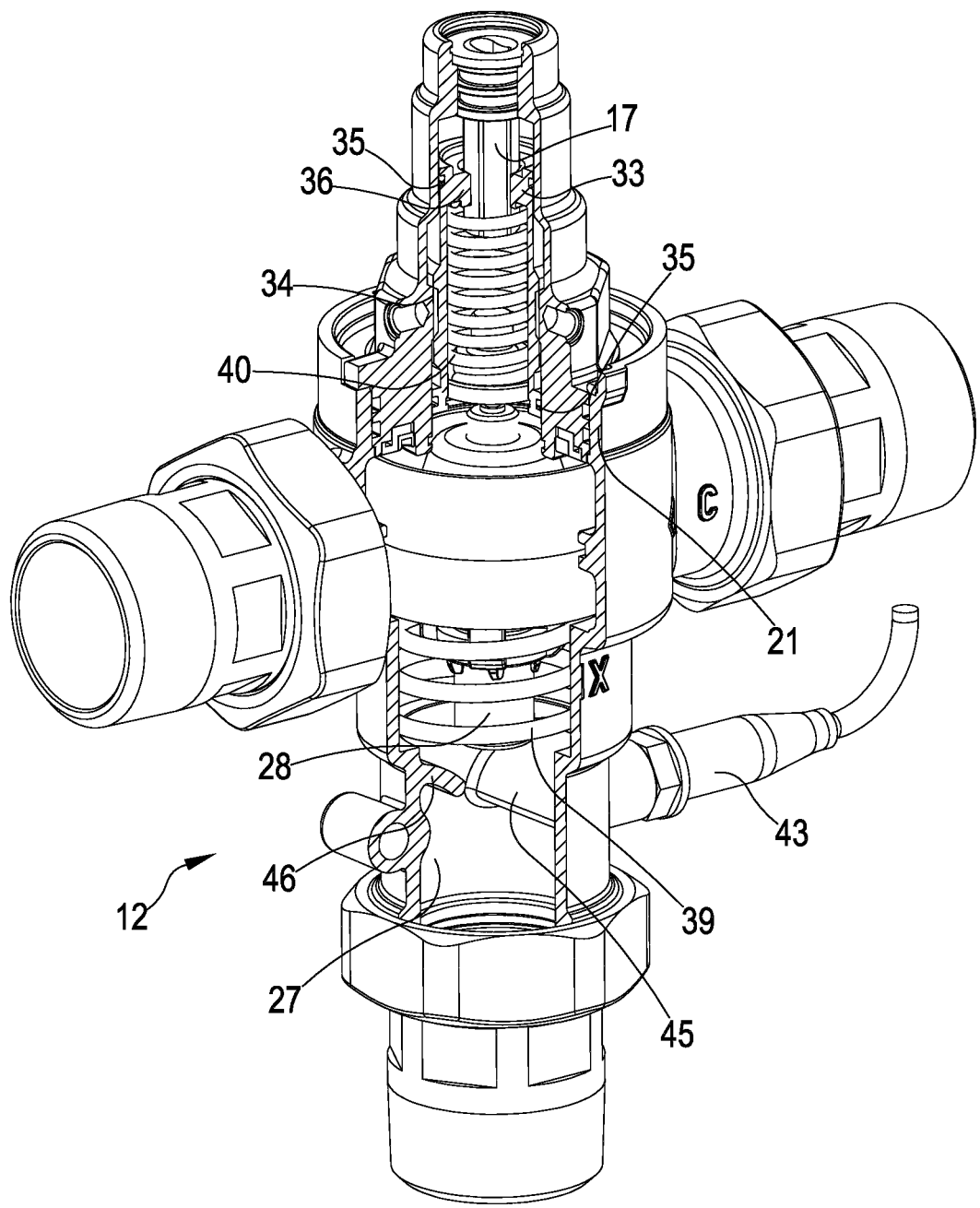
FIG. 3 is a partially sectioned prospective view of the device of FIG. 1 with a component removed.
Figure 4:
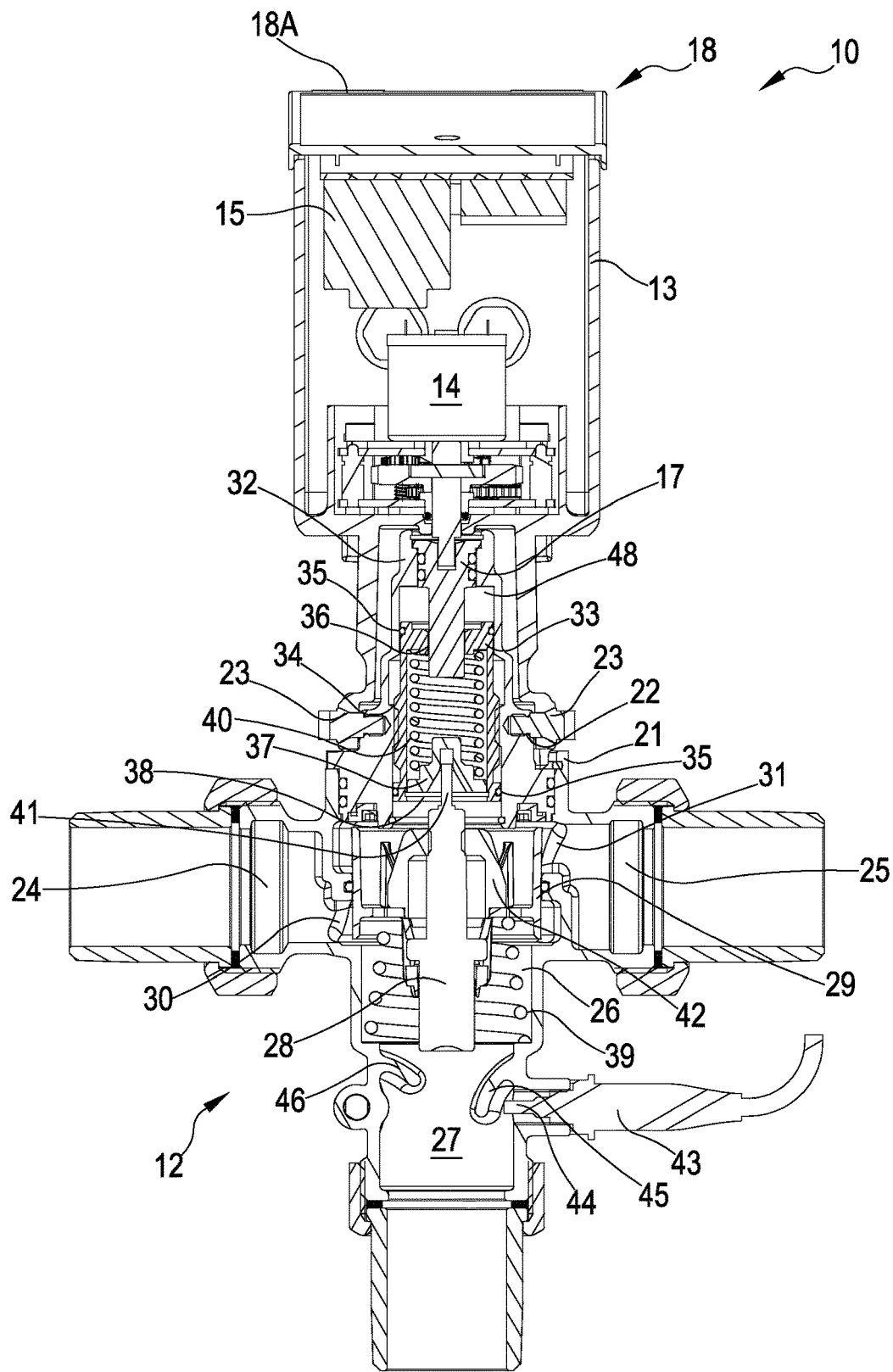
FIG. 4 is an axial section view of the device of FIG. 1.
Figures 5, 6:
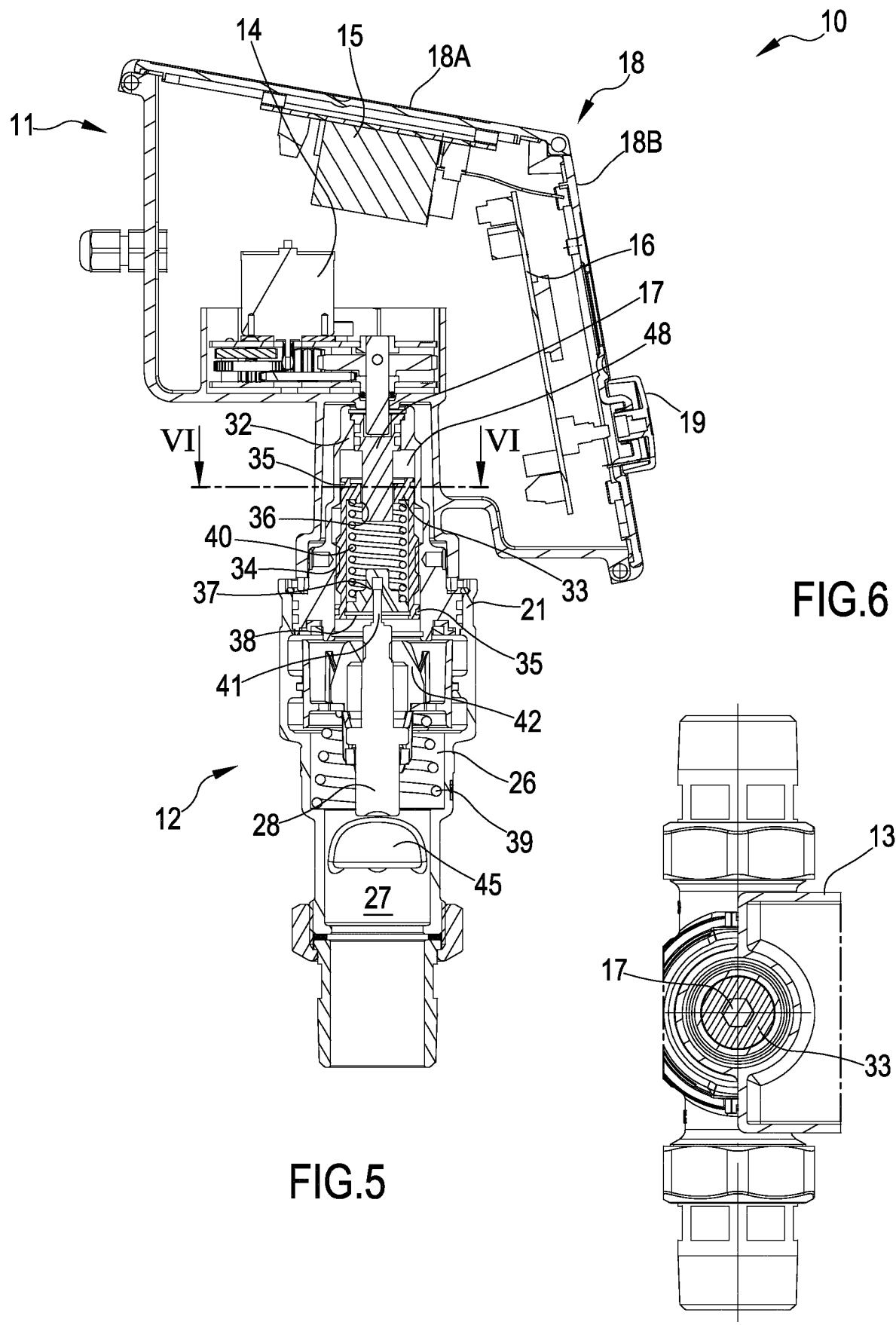
FIG. 5 is another axial section view of the device of FIG. 1, rotated axially by 90° with respect to the view of FIG. 4.
FIG. 6 is a section view of the device of FIG. 1 according to the axis VI-VI of FIG. 5.

The gearmotor 11 has a box-like body or container 13 in which (FIGS. 4, 5) an electric motor 14, a power unit 15 and a logic board 16 are received.

The electric motor 14 is connected to a driving shaft 17 with a polygonal section through a series of rotation speed reducing gears.

The box-like body 13 is closed by a cover 18 formed by two walls 18A and 18B hinged on one another, both of rectangular shape and with the same dimensions; the two walls 18A,18B are secured and fixed by bolts and screws in a removable manner to the box-like body 13; on the wall 18B an adjusting knob 19, a display 20, and two luminous LED indicators 49 are fitted.

The valve 12 has (FIGS. 4, 5) a valve body 21 to which the box-like body 13 of the gearmotor 11 is fixed coaxially. The valve body 21 has a hollow head 32 that has a series of annular holes 22: into one pair of opposite holes 22 two screws 23 are inserted that removably secure the box-like body 13 to the hollow head 32.

The valve body 21 has a hot water inlet conduit 24, a cold water inlet conduit 25, a mixing chamber 26, and a mixed hot/cold water outlet conduit 27 connected to the mixing chamber 26.

Inside the mixing chamber 26 a thermostat 28 of elongated shape is installed, which expands and reduces according to the temperature, for example a wax thermostat.

To the thermostat 28 a cup-shaped shutter 29 is fixed that is intended to be moved axially through the action of the thermostat 28.

In moving axially the shutter 29 alternatively opens or closes with its cylindrical wall a lower port 30 communicating with the hot water inlet conduit 24 and an upper port 31 communicating with the cold water inlet conduit 25. In this axial movement the shutter 29 positions itself below and above against suitable inner seats of the valve body 21.

In the hollow head 32 of the valve body 21 a hollow shaft 33 is fitted. The hollow shaft 33 has a threaded outer portion 34 that is screw-coupled with the inner wall of the hollow head 32; on the outer wall of the hollow shaft 33 two annular sealing gaskets 35 are fitted, a lower and an upper one, that prevent water flowing into the threaded zone. At an upper end, the hollow shaft 33 has an axial polygonal hole 36 that couples with the driving shaft 17 of the gearmotor 11. To the other end of the hollow shaft 33 an abutting element 37 is fitted axially that is retained inside the hollow shaft 33 by a washer 38.

On the shutter 29 a thrust spring 39 acts, which is coaxial with the thermostat 28, and located inside the valve body 21 in the lower part of the latter. This spring 39 tends to move the shutter 29 that is integral with the thermostat 28 to the closed position of the cold water conduit.

Inside the hollow shaft 33 on the other hand, an extra-stroke spring 40 which is coaxial with the hollow shaft 33 acts on the abutting element 37. On the opposite side, a rod-shaped end 41 of the thermostat 28 acts on the abutting element 37. This spring 40, which is stiffer than the spring 39, counters elastically the expanding action of the thermostat 28.

In the mixing chamber 26, on the thermostat 28 a substantially conical cap 42 is fitted coaxially inside the shutter 29.

At the outlet conduit 27, on the valve body 21 a thermal probe 43 is fitted that is connected to the logic board 16. The thermal probe 43 has a detecting tip 44 that protrudes inside the outlet conduit 27. At the tip 44, inside the cylindrical outlet conduit 27, a wing 45 is made that has a profile that is curved downwards and has an extent with a circular sector; this wing 45 creates a turbulent water motion in the outlet conduit 27. On the part opposite the wing 45 a further wing 46 is fitted that also has a profile that curves downwards and extends in a circular sector; this wing 46 also creates a turbulent water motion in the outlet conduit 27 in addition to the action of the wing 45.

The device 10 is also provided with a thermometer indicator 47 fitted at the outlet conduit 27 for reading the temperature of the exiting mixed water.

The operation of the device 10 is as follows.

First, the desired temperature value of the mixed hot/cold water is set by the user by the knob 19, or remotely by a suitable interface.

The logic board 16 detects the temperature value in the outlet conduit 27 from the probe 43.

If the detected temperature differs from the required temperature the logic board 16 activates the electric motor 14, which rotates the hollow shaft 33 by the shaft 17. The shaft 33 also moves axially owing to the screw coupling with the inner wall of the hollow head 32, sliding along the shaft 17. The axial movement of the hollow shaft 33 determines an equal movement of the abutting element 37 and consequently of the thermostat 28 and of the shutter 29, given the constraint therebetween set by the springs 39,40. When the temperature detected in the outlet conduit 27 by the probe 43 corresponds to the required temperature, the logic board 16 stops the electric motor 14 and deactivates the gearmotor 11. The shutter 29 is arranged in such a position with respect to the inlet ports 30 and 31 as to perform mixing of the hot water and of the cold water so as to obtain mixed water at the required temperature in the outlet conduit 27.

At this point, the work of the thermostat 28 starts, which has the task of maintaining the value of the mixed water within the set tolerances. In the event of deviation from the set tolerances, the thermostat 28 moves the shutter 29 again by a minimal amount, to maintain constant and within the set limits the temperature of the mixed water. The abutting element 37 constitutes a fixed reaction point for the thermostat 28 in the thermal expansion and reduction thereof; in the expansion of the thermostat 28 the shutter 29 lowers in contrast to the action of the spring 39 whereas in the reduction of the thermostat 28 the shutter 29 rises on the action of the spring 39. The spring 40, which is stiffer than the spring 39, has a certain elastic yield to prevent breakages of the thermostat 28 in the event of expansions thereof beyond the limit.

Figure 7:
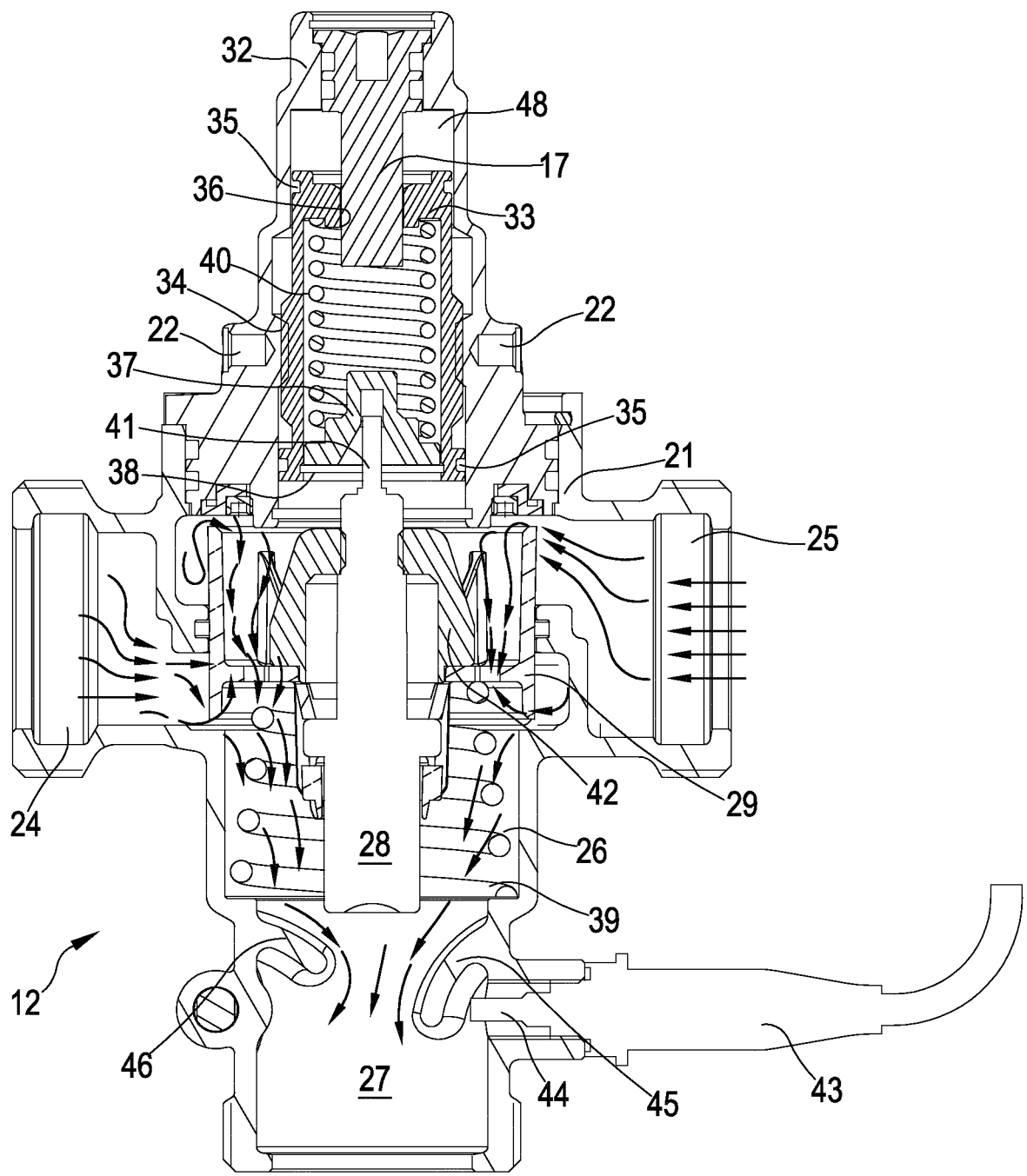
FIG. 7 shows the operation of the device of FIG. 1, in an axial section and with the aforesaid component removed.

In FIG. 7, the mixing path of the hot water and of the cold water is shown by the arrows.

If it is desired to vary the value of the temperature of the mixed water in the outlet conduit 27 or perform thermal disinfection, the gearmotor 11 is reactivated, which again moves the thermostat 28/shutter 29 unit to seek the position corresponding to desired outlet temperature value. In the case of thermal disinfection, the shutter 29 can be taken to the upper end stroke so as to close completely the cold water flow upper port 31, making an adjustment over the limit values of the thermostat.

The logic board 16 can be suitably programmed by the user so as to activate the gearmotor 11 for a suitable timing and period.

During operation of the mixer valve device 10, the water seeps through the abutting element 37, filling the hollow shaft 33 and from here seeps through the coupling between the shaft 17 and the hollow shaft 33, filling the gap 48 that forms upwardly between the hollow shaft 33 and the hollow head 32. In this manner, on the hollow shaft 33 opposing hydraulic forces of equal value operate.

The wings 45 and 46 create water turbulence in the outlet conduit 27.

The device 10 disclosed and illustrated has several advantages.

Owing to the fact that the gearmotor 11I is activated only in the event of setting the temperature value of the exiting mixed water or for particular operations like thermal disinfection or great deviation from the set temperature value, the device 10 has reduced mechanical wear and low electric consumption.

In the event of an interruption to the electric power supply to the gearmotor 11 or in the event of a gearmotor 11 fault, the device 10 is able to perform the thermoregulation task owing to the thermostat 28. This makes the device 10 particularly safe and reliable. Further, the device 10 takes advantage of the functions of the thermostat such as reaction speed, precision and "shut-off" function in the event of a sudden lack of cold water during the mixing step.

Owing to the washers 35 that prevent the flow of water to the screw coupling between the hollow shaft 33 and the hollow head 32 and owing to the hydraulic balance of the hollow shaft 33, the screwing/unscrewing movement of the hollow shaft 33 is devoid of friction and resistance. This enables a low-power electric motor to be used and jamming in the rotation of the hollow shaft 33 to be avoided. This also enables the device 10 to be made compact and reliable.

The cap 42 performs the function of thermally protecting the thermostat 28 and of conveying the flow. The thermal protection function ensures the operating precision of the thermostat 28.

The turbulence created by the wings 45 and 46 in the mixed water permits correct reading immediately below the mixing chamber 26 of the temperature value of the mixed water by the thermal probe 43 without having to arrange the probe far from the mixing chamber, where the water would be already perfectly mixed. This makes the device 10 even more compact.

Figure 8:
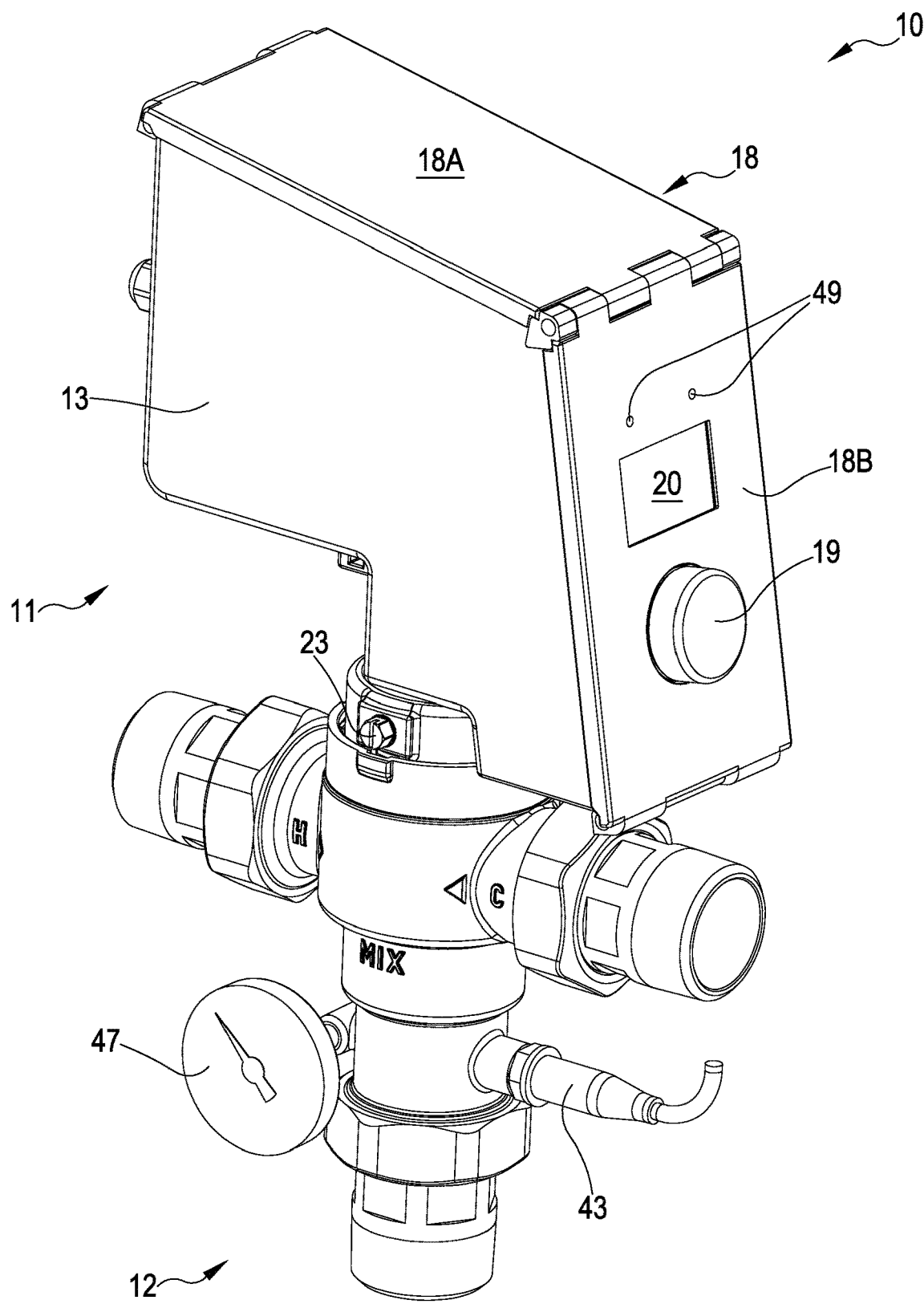
FIGS. 8, 9 show the device of FIG. 1 with the aforesaid component oriented in different ways.
Figure 9:
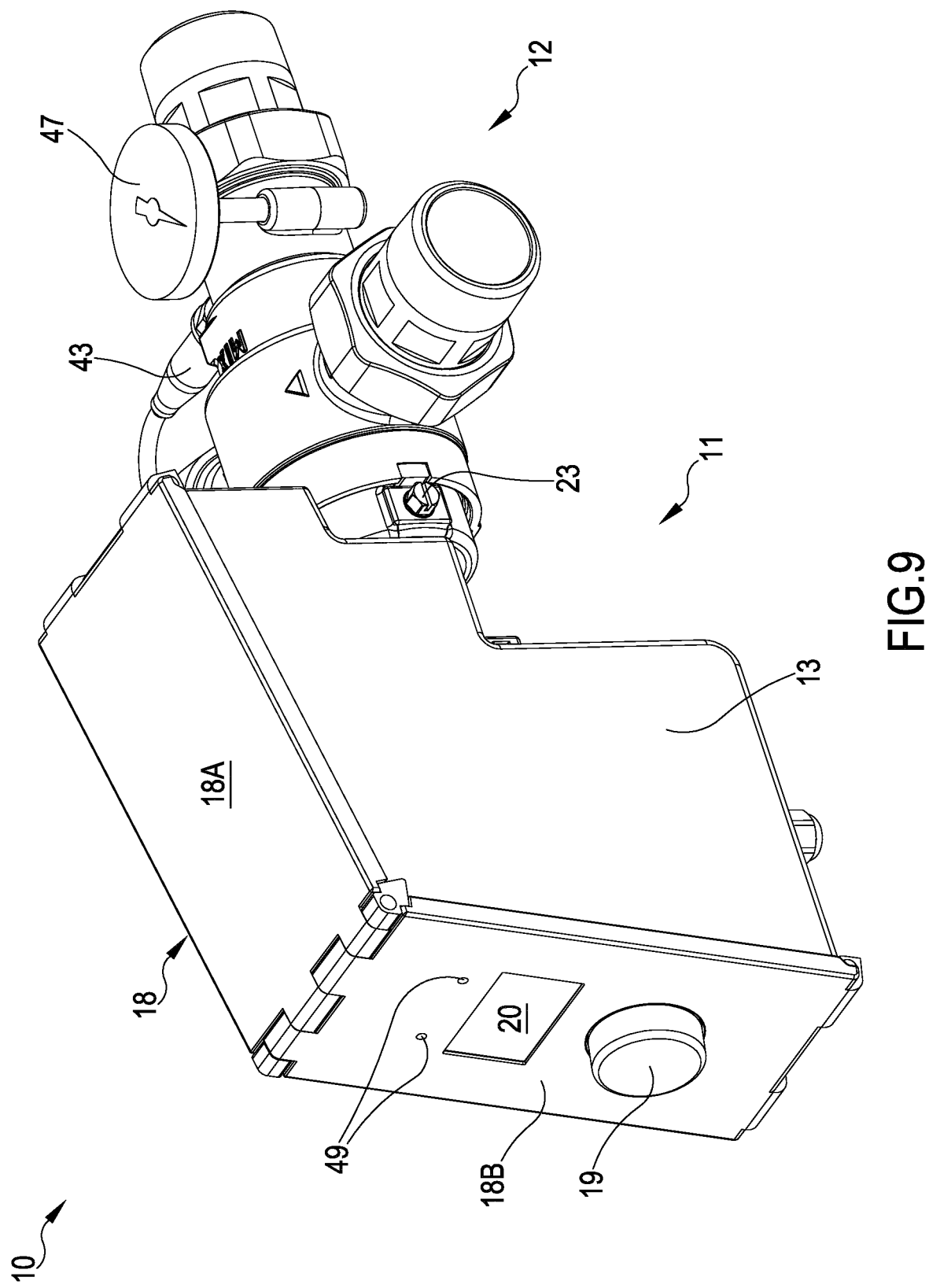

The gearmotor 11 can be rotated and fixed in another position with respect to the illustrated position by varying the coupling between the holes 22 of the hollow head 32 and the screws 23, and, further, the position of the walls 18A and 18B can be inverted, being of the same shape and dimensions: this is very, important if the location of the device 10 in the installation requires a different orientation of the knob 19, of the display 20, and of the LED indicators 49, so that they can be accessible and visible for the user, as shown in FIGS. 8, 9.

It is clear that variations on and/or additions to what has been disclosed and illustrated above can be made.

The configuration of the mixer valve device can vary according to needs.

The components of the device disclosed and illustrated can vary in the configuration, in the arrangement and in the number.

The device can be used in general to mix any type of hot and cold fluid.

The thermal probe can also be omitted and in this case the gearmotor will move the shutter to a set mechanical position in function of the required temperature of the mixed water.

The invention claimed is:

1. A mixer valve for mixing hot and cold fluids, comprising
    (a) a valve body having a longitudinal axis and including a hot water inlet conduit, a cold water inlet conduit, and a mixing chamber for receiving water from said hot and cold water conduits;
    (b) a mixed water outlet conduit connected with said valve body for receiving mixed water at a preset temperature;
    (c) a thermostat arranged within said mixing chamber coaxial with said valve body and including a movable shutter adjacent to said hot and cold water inlet conduits;
    (d) a hollow shaft arranged coaxially within and connected with said valve body via a screw coupling for axial displacement relative to said valve body;
    (e) an elastically yieldable abutting element mounted within one end of said hollow shaft in such a manner as to permit seepage of water into said hollow shaft, an end of said thermostat engaging said abutting element via an elastic force;
    (f) at least one gasket arranged on an outer surface of said hollow shaft adjacent to said screw coupling between said hollow shaft and said valve body to insulate said screw coupling from water in said mixing chamber; and
    (g) an electric motor including a drive shaft extending within said valve body for connection with an end of said hollow shaft opposite said elastic abutting element, said connection between said drive shaft and said hollow shaft permitting seepage of water into said hollow shaft, thereby to provide opposing hydraulic forces and a hydraulic balance within said hollow shaft, said electric motor being operable between an activated state in which said drive shaft rotates said hollow shaft to axially displace said hollow shaft, said thermostat and said shutter to adjust the flow of hot and cold water to said mixing chamber to obtain a desired temperature of mixed water in said mixing chamber and a deactivated state in which said thermostat maintains the desired temperature within a preset tolerance by corresponding displacement of said shutter.

2. The mixer valve according to claim 1, and further comprising at least one thermal probe arranged at said outlet conduit and connected to said electric motor to detect the temperature of the water mixed inside the outlet conduit and activate said electric motor according to the temperature detected by said thermal probe to move said shutter to the position relative to said hot and cold water inlet conduits to control a flow of inlet water to achieve the required temperature value of the mixed water and to deactivate said electric motor once said position is reached.

3. The mixer valve according to claim 1, and further comprising a first spring biasing said shutter and a second spring biasing said abutting element, said second spring having greater stiffness than said first spring.

4. The mixer valve according to claim 2, wherein the said outlet conduit contains at least one first fin for deflecting mixed water; arranged at said thermal probe.

5. The mixer valve according to claim 4, wherein said outlet conduit contains a second fin for deflecting the mixed water opposite said first fin.

6. The mixer valve according to claim 5, wherein said outlet conduit has a cylindrical configuration and said first and second fins have a profile curved downwards and an extent according to a circular sector.

7. The mixer valve according to claim 1, and further comprising a conical cup for protecting said thermostat in said mixing chamber.

8. The mixer valve according to claim 1, wherein said electric motor is arranged in a container closed by a cover including several walls having an interchangeable position.

9. The mixer valve according to claim 8, wherein said container is coupled with said valve body in an angularly adjustable manner.

* * * * *